United States Patent
Zhang et al.

(10) Patent No.: US 7,110,617 B2
(45) Date of Patent: *Sep. 19, 2006

(54) REBINNING METHODS AND ARRANGEMENTS FOR USE IN COMPRESSING IMAGE-BASED RENDERING (IBR) DATA

(75) Inventors: Cha Zhang, Pittsburgh, PA (US); Jin Li, Redmond, WA (US); Yunnan Wu, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/967,472

(22) Filed: Oct. 18, 2004

(65) Prior Publication Data

US 2005/0078875 A1 Apr. 14, 2005

Related U.S. Application Data

(63) Continuation of application No. 09/702,051, filed on Oct. 27, 2000, now Pat. No. 6,959,120.

(51) Int. Cl.
*G06K 9/36* (2006.01)

(52) U.S. Cl. .................. 382/284; 382/154; 348/36

(58) Field of Classification Search ............. 382/284, 382/285, 289, 293, 154, 232, 235, 239, 240, 382/248; 345/417, 419, 619, 629, 630, 634, 345/635, 638, 656, 427; 348/36, 38, 39, 348/42, 46; 352/69, 70
See application file for complete search history.

(56) References Cited

U.S. PATENT DOCUMENTS

| | | |
|---|---|---|
| 5,694,531 A | 12/1997 | Golin et al. |
| 6,028,584 A | 2/2000 | Chiang et al. |
| 6,393,163 B1 | 5/2002 | Burt et al. |
| 6,424,351 B1 | 7/2002 | Bishop et al. |
| 6,469,710 B1 | 10/2002 | Shum et al. |
| 6,532,036 B1 | 3/2003 | Peleg et al. |
| 6,549,651 B1 | 4/2003 | Xiong et al. |

(Continued)

OTHER PUBLICATIONS

Shum Heung-Yeung et al.,"Interactive Construction of 3D Models from Panoramic Mosaics" Computer Vision and Pattern Recognition 1998 IEEE Computer Society Conference Jun. 23-25, 1998.
Shum Heung-Yeung et al.,"Construction and Refinement Panoramic Mosaics with Global and Local Alignment" Computer Vision 1998 Sixth International Conference on Jan. 4-7, 1998 pp. 953-956.

(Continued)

*Primary Examiner*—Yon J. Couso
(74) *Attorney, Agent, or Firm*—Lee & Hayes, PLLC

(57) ABSTRACT

Rebinning methods and arrangements are provided that significantly improve the 3D wavelet compression performance of the image based rendering data, such as, e.g., concentric mosaic image data. Through what is essentially a selective cutting and pasting process the image data is divided into stripes that are then used to form a set of multi-perspective panoramas. The rebinning process greatly improves the performance of the cross shot filtering, and thus improves the transform and coding efficiency of 3D wavelet codecs. While the region of support after rebinning may cease to be rectangular in some cases, a padding scheme and an arbitrary shape wavelet coder can be implemented to encode the result data volume of the smart rebinning. With an arbitrary shape wavelet codec, the rebinning outperforms MPEG-2 by 3.7 dB, outperforms direct 3D wavelet coder by 4.3 dB, and outperforms a reference block coder (RBC) by 3.2 dB on certain tested concentric mosaic image scenes. Hence, the rebinning process nearly quadruples the compression ratio for selected scenes. Additional methods and arrangements are provided that include selectively dividing the image data into slits and rebinning the slits into a huge 2D array, which is then compressed using conventional still image codecs, such as, JPEG.

11 Claims, 11 Drawing Sheets

U.S. PATENT DOCUMENTS 6,553,148 B1    4/2003   Zeng et al.
6,639,596 B1    10/2003  Shum et al.
6,674,911 B1    1/2004   Pearlman et al.
6,687,753 B1    2/2004   Schneider

OTHER PUBLICATIONS

Shum Heung-Yeung et al.,"Stereo Reconstruction from Multiperspective Panoramas" Computer Vision 1999 Proceedings of the Seventh IEEE International Conference on Sep. 20-27, 1999 vol. 1 pp. 14-21.

Fig. 7

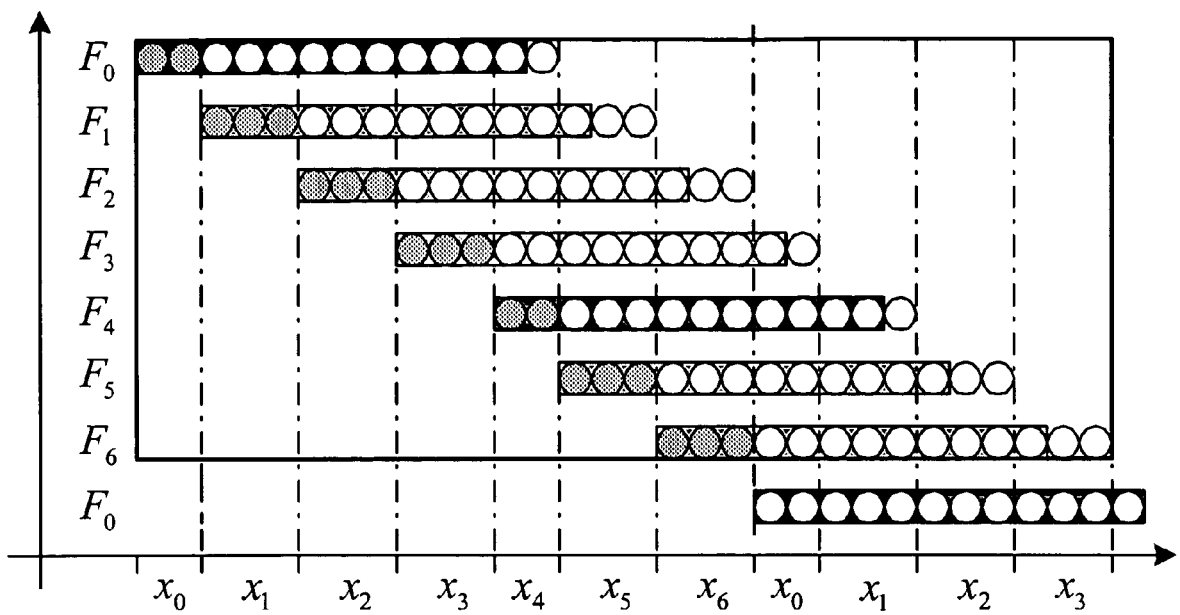

Fig. 10

| | Test Dataset<br>Algorithm | LOBBY<br>(0.2 bpp) | LOBBY<br>(0.12 bpp) | KIDS<br>(0.4 bpp) | KIDS<br>(0.24 bpp) |
|---|---|---|---|---|---|
| A | MPEG-2 | Y: 32.2<br>U: 38.7<br>V: 38.1 | Y: 30.4<br>U: 37.4<br>V: 36.9 | Y: 30.1<br>U: 36.6<br>V: 36.7 | Y: 28.3<br>U: 34.8<br>V: 34.9 |
| B | 3D Wavelet | Y: 31.9<br>U: 40.3<br>V: 39.9 | Y: 30.0<br>U: 39.3<br>V: 38.9 | Y: 29.4<br>U: 36.5<br>V: 37.2 | Y: 27.3<br>U: 34.9<br>V: 35.7 |
| C | RBC | Y: 32.8<br>U: 39.7<br>V: 40.5 | Y: 29.8<br>U: 38.4<br>V: 39.0 | Y: 31.5<br>U: 39.3<br>V: 38.9 | Y: 28.7<br>U: 37.3<br>V: 36.6 |
| D | Simple rebinning | Y: 35.5<br>U: 41.5<br>V: 40.9 | Y: 33.6<br>U: 40.7<br>V: 40.2 | Y: 32.8<br>U: 39.3<br>V: 40.1 | Y: 30.5<br>U: 37.7<br>V: 38.5 |
| E | Smart rebinning<br>+ padding | Y: 36.0<br>U: 41.6<br>V: 41.0 | Y: 34.0<br>U: 40.9<br>V: 40.2 | Y: 33.4<br>U: 39.9<br>V: 41.1 | Y: 31.1<br>U: 38.4<br>V: 39.6 |
| F | Smart rebinning<br>+arbitrary shape<br>wavelet codec | Y: 36.3<br>U: 43.9<br>V: 42.8 | Y: 34.3<br>U: 42.9<br>V: 42.0 | Y: 33.8<br>U: 41.1<br>V: 41.2 | Y: 31.3<br>U: 39.5<br>V: 39.6 |

Fig. 11

|  | LOBBY(0.4bpp) | LOBBY(0.2bpp) |
|---|---|---|
| MPEG2 (dB) | Y:35.3<br>U:41.7<br>V:40.7 | Y:32.4<br>U:40.3<br>V:39.6 |
| JPEG 2000 (dB) | Y:32.1<br>U:38.7<br>V:38.0 | Y:28.4<br>U:36.6<br>V:36.2 |
| ROSS (dB) | Y:36.5<br>U:42.4<br>V:41.7 | Y:33.0<br>U:40.3<br>V:39.9 |
|  | KIDS(0.4bpp) | KIDS(0.6bpp) |
| MPEG2 (dB) | Y:29.9<br>U:38.1<br>V:38.1 | Y:31.7<br>U:39.4<br>V:39.5 |
| JPEG 2000 (dB) | Y:27.4<br>U:33.6<br>V:33.8 | Y:29.4<br>U:35.3<br>V:35.3 |
| ROSS (dB) | Y:30.7<br>U:36.8<br>V:37.4 | Y:33.0<br>U:38.3<br>V:38.8 |

REBINNING METHODS AND ARRANGEMENTS FOR USE IN COMPRESSING IMAGE-BASED RENDERING (IBR) DATA

RELATED APPLICATIONS

This application is a continuation application of U.S. patent application Ser. No. 09/702,051 filed Oct. 27, 2000, now U.S. Pat. No. 6,959,120 entitled "Rebinning Methods and Arrangements for Use In Compressing Image-Based Rendering (IBR) Data" to Zhang et al., to which it claims priority.

TECHNICAL FIELD

This invention relates to image-based rendering (IBR), and more particularly to certain rebinning methods and arrangements for use in compressing IBR data.

BACKGROUND

There is a continuing interest, within the computer graphics community, in image-based rendering (IBR) systems. These systems are fundamentally different from traditional geometry-based rendering systems, in that the underlying information (i.e., data representation) is composed of a set of photometric observations (e.g., digitized images/photographs) rather than being either mathematical descriptions of boundary regions or discretely sampled space functions.

An IBR system uses the set of photometric observations to generate or render different views of the environment and/or object(s) recorded therein. There are several advantages to this approach. First, the display algorithms for IBR systems tend to be less complex and may therefore be used to support real-time rendering in certain situations. Secondly, the amount of processing required to view a scene is independent of the scene's complexity. Thirdly, the final rendered image may include both real photometric objects and virtual objects.

IBR systems can be complex, however, depending upon the level of detail required and the processing time constraints. For example, Adelson et al., in their article entitled "The Plenoptic Function And The Elements Of Early Vision", published in Computational Models of Visual Processing by The MIT Press, Cambridge, Mass. 1991, stated that a 7-dimensional plenoptic function can be implemented in an IBR system to completely represent a 3-dimensional dynamic scene. The 7-dimensional plenoptic function is generated by observing and recording the intensity of light rays passing through every space location as seen in every possible direction, for every wavelength, and at any time. Thus, imagine an idealized camera that can be placed at any point in space $(V_x, V_y, V_z)$. This idealized camera can then be used to select any of the viewable rays by choosing an azimuth angle ($\theta$) and elevation angle ($\phi$), as well as a band of wavelengths ($\lambda$). Adding an additional parameter (t) for time, produces a 7-dimensional plenoptic function:

$$p = P(\theta, \phi, \lambda, V_x, V_y, V_z, t)$$

Thus, given function p, to generate a view from a specific point in a particular direction, one need only to merely plug-in the values for $(V_x, V_y, V_z)$ and select from a range of ($\theta$, $\phi$) for some constant t for each desired a band of wavelengths ($\lambda$).

Accomplishing this in real-time, especially for a full spherical map or a large portion thereof, is typically beyond most computer's processing capability. Thus, there was a need to reduce the complexity of such an IBR system to make it more practical.

By ignoring the time (t) and the wavelength ($\lambda$) parameters, McMillan and Bishop in their article entitled "Plenoptic Modeling: An Image-Based Rendering System" published in Computer Graphics Proceedings (SIGGRAPH'95) August 1995, disclosed a plenoptic modeling scheme that generates a continuous 5-dimensional plenoptic function from a set of discrete samples. Further research and development by Gortler et al., lead to the development of the Lumigraph as disclosed in an article entitled "The Lumigraph" that was published in Computer Graphics Proceedings (SIGGRAPH'96) in August, 1996. Similarly, Levoy et al. developed a Lightfield as disclosed in an article entitled "Light Field Rendering" that was also published in Computer Graphics Proceedings (SIGGRAPH'96) in August of 1996. The Lumigraph and the Lightfield presented a clever 4-dimensional parameterization of the plenoptic function provided the object (or conversely the camera view) is constrained within a bounding box.

In an article entitled "Rendering With Concentric Mosaic", published in Computer Graphics Proceedings (SIGGRAPH'99) in August 1999, Shum & He introduced a COncentric Mosaic (COM) that reduced the plenoptic function to 3-dimensions by restricting the viewer's movement on a plane. This technique is described in co-pending, commonly assigned U.S. patent application Ser. No. 09/222, 488 entitled "Rendering With Concentric Mosaics".

In the COM technique taught by Shum & He, a mosaic image represents a collection of consecutive slit images of the surrounding 3D scene taken in a direction tangent to a viewpoint on a circle on the aforementioned plane within the scene. In this manner, mosaic image data is generated for a plurality of concentric circles on the plane, hence the name, "concentric mosaic." When a novel view on the plane is to be rendered, the COM technique considers the slit images within a stack of mosaic images of differing radiuses to determine how best to render the scene. This provides a powerful tool for conducting 3D walkthroughs of actual and/or virtual scenes.

The COM technique, however, tends to generate and require a significant amount of data. For example, let us assume that the mosaic image for each concentric circle is 240 pixels high by 1350 pixels long and that there are 320 concentric mosaic images generated to provide for adequate depth resolution within the scene. In this case, the resulting COM data would total nearly 300 mega-bytes (MB).

Storing and/or processing this amount of data can be a daunting task for many computers, especially when the walkthrough is to be displayed without significant or perceptible delays between rendered images. Moreover, transporting this amount of data, for example, over the Internet using a 56K baud modem is simply impractical.

As such, there has been a movement to compress the COM data, such that the COM techniques can be made readily available using current technology. For example, conventional vector quantization techniques have been used to compress the nearly 300 MB COM data down to 25 MB (about a 12:1 ratio). Unfortunately, a 25 MB data file requires about one hour to download using a 56K baud modem.

Since the data structure of concentric mosaics can be regarded as a video sequence with slowly panning camera motion, video compression techniques may be employed to compress the COM data. Here, for example, at least two major categories of video compression techniques may be considered useful. The first category includes conventional video compression standards, such as MPEGx and H.26x, which basically adopt a prediction-based framework, where the temporal redundancy across frames is reduced through motion compensation and block residue coding.

The first category would also include more recently developed techniques like the reference block coder (RBC) described by C. Zhang et al., in "Compression And Rendering Of Concentric Mosaic Scenery With Reference Block Coding," presented in June 2000 at the SPIE Visual Communication and Image Processing (VCIP 2000) conference, which is incorporated herein, in its entirety, by reference.

The second category includes, three-dimensional (3D) wavelet video coders. Examples are described in articles by: D. Taubman et al., entitled "Multirate 3-D Subband Coding Of Video," and J. R. Ohm, entitled "Three-Dimensional Subband Coding With Motion Compensation," in IEEE Trans. On Image Processing, Vol. 3, No. 5, September 1994; A. Wang et al., entitled "3D Wavelet Coding Of Video With Global Motion Compensation," presented March 1999 at Proc. DCC'99 in Snowbird, Utah; and, J. Y. Tham et al., entitled "Highly Scalable Wavelet-Based Video Codec For Low Bit-Rate Environment," IEEE Journal on Selected Areas in Communications, Vol. 16, No. 1, January 1998.

Basically, these and other like 3D wavelet video coders present another category of video coding approaches that explore the temporal redundancy via temporal direction wavelet filtering. One attractive property of the 3D wavelet video coder is its spatial-temporal-quality scalability.

Here, the term scalability means that a 3D wavelet coder can compress video into a single bitstream, where multiple subsets of the bitstream can be decoded to generate complete videos of different spatial resolution/temporal resolution/quality commensurate with the proportion of the bitstream decoded. For more information see, e.g., "A Common Framework For Rate Distortion Based Scaling Of Highly Scalable Compressed Video," by D. Taubman et al., IEEE Trans. On Circuits and Systems for Video Technology, Vol. 6, No. 4, August 1996.

Scalability is extremely useful in a data-streaming environment, such as the Internet, etc., where heterogeneous decoder/network settings prevail. Furthermore, since 3D wavelet based coders avoid the recursive loop that is present in most predictive coders, they tend to perform better in an error prone environment, such as a wireless network.

The second category would also include more recently developed data alignment techniques, for example, as described by L. Luo et al., in "Compression Of Concentric Mosaic Scenery With Alignment And 3D Wavelet Transform," presented in January 2000 at the SPIE Image and Video Communications and Processing and Image Processing (SPIE 3974-10) conference in San Jose, Calif., and which is incorporated herein, in its entirety, by reference.

Based on these previous efforts, 3D wavelet transform coding systems have been developed to compress the COM data. The compression performance of such coders, however, could stand further refinement. As such, there is a need to determine is any performance bottlenecks exist and to further improve the compression performance of various 3D wavelet coders.

In a 3D wavelet coder, for example, a wavelet transform is applied separately along the horizontal, vertical and temporal directions to concentrate the signal energy into relatively few large coefficients. However, one common problem with conventional 3D wavelet compression schemes is that the temporal wavelet filtering does not always achieve efficient energy compaction.

In a prediction-based video/concentric mosaic coder, local motion can be specified on a per block basis. Consequently, inter-frame correlation due to the moving object/camera, for example, can be explored and made beneficial to the coding performance.

Unfortunately, local motion cannot be easily incorporated into the framework of conventional 3D wavelet compression schemes. Because of the transform nature of the temporal filtering, each pixel has to be engaged in one and only one transform. Taubman et al. have proposed a pan compensation module that aligns the image frames prior to the wavelet transform. In the wavelet concentric mosaic codec proposed by Luo et al., a panorama alignment module was used to eliminate global translation. Wang et al. proposed to register and warp all image frames into a common coordinate and then apply a 3D wavelet transform with arbitrary region of support to the warped volume. To make use of local block motion, Ohm incorporated block matching and carefully handled the covered/uncovered, connected/unconnected regions. By trading off an invertibility requirement, Tham et al. employed a block-based motion registration for the low motion sequences without filling the holes caused by individual block motion. Unfortunately, each of these various proposed approaches tends to be complex, and in particular those of Ohm and Tham et al. tend to be very complex.

M. Magnor and B. Girod have used 4D Haar wavelet for the coding of Lumigraph/Lightfield. For more information see, e.g., "Two approaches to incorporate approximate geometry into multiview image coding" presented in September 2000 at the IEEE International Conference on Image Processing (ICIP 2000) conference in Vancouver, BC and the "Model-based coding of multi-viewpoint imagery", presented in June 2000 in Perth, Australia at the SPIE Visual Communications and Image Processing 2000(VCIP'2000). Their conclusion is that high dimensional wavelet coder is inferior in performance compared with a predictive based coder. However, as indicated in this patent, it can be observed that misalignment of data is the major cause of compression inefficiency.

Consequently, there is a need for further improved methods and arrangements for use in compressing IBR data, such as, e.g., COM data. Preferably, the methods and arrangements will support the scalability requirements associated with various devices and provide for efficient communication over various communication services.

SUMMARY

The above stated needs and other are met by various improved methods and arrangements that rearrange or rebin the image based rendering data prior to compression. As a result of the rebinning process, the compression ratios are significantly increased. The rebinning process may take on several forms, including, for example, a simple rebinning process, a smart rebinning process and a Rebinning Of SlitS (ROSS) process.

Thus, for example, in accordance with certain aspects of the present invention, a method is provided to support either a simple rebinning process or a smart rebinning process. The method includes selectively aligning at least two image based rendering (IBR) image data along a specific direction, and selectively rebinning the aligned IBR image data to form a multi-perspective panorama. Here, the IBR image data may include concentric mosaic (COM) image data and the specific direction may be substantially along a horizontal direction with respect to a captured scene. The method, in certain implementations includes, pair-wise aligning of COM image data, then subdividing each of the COM image data into a plurality of portions and combining a specific portion selected from each COM image data to form a portion of the multi-perspective panorama. This subdivision can be accomplished based on the magnitude of a determined or otherwise set displacement vector. For a simple rebinning process the displacement vector will remain static. For a smart rebinning process the displacement value may dynamically change.

A ROSS process is supported, for example, by a method that includes providing a plurality of concentric mosaic image data, dividing each of the plurality of concentric mosaic image data into slits, rebinning all of the slits into a two-dimensional array, and compressing the two-dimensional array using a conventional image compression algorithm.

BRIEF DESCRIPTION OF THE DRAWINGS

A more complete understanding of the various methods and arrangements of the present invention may be had by reference to the following detailed description when taken in conjunction with the accompanying drawings wherein:

FIG. 7 is a graphical depiction of an original data set, as generated in FIG. 5, for example, that includes a plurality of frames of concentric mosaic image data.

FIG. 10 is graphical depiction of a rebinning process, associated with the exemplary data sets in FIGS. 8 and 9.

FIG. 11 is a Table comparing experimental results for compressing concentric mosaic images associated with two exemplary scenes, namely, a Lobby scene and a Kid's scene.

DETAILED DESCRIPTION

Introduction

The logical operations of the various embodiments of the present invention are implemented (1) as a sequence of computer implemented steps running on a computing system or like device/appliance, and/or (2) as interconnected machine logic modules within the computing system or like device/appliance. The implementation is a matter of choice dependent on the performance requirements of the computing system implementing the invention. Accordingly, the logical operations described herein are referred to variously as operations, processes, steps, engines or modules. While the following description is directed towards Concentric Mosaic (COM) images/data, those skilled in the art will recognize that other types of mosaic or partial mosaic image/object data may benefit from the various methods and arrangements described herein.

Functional Overview of Certain Exemplary Arrangements

Figure 1:
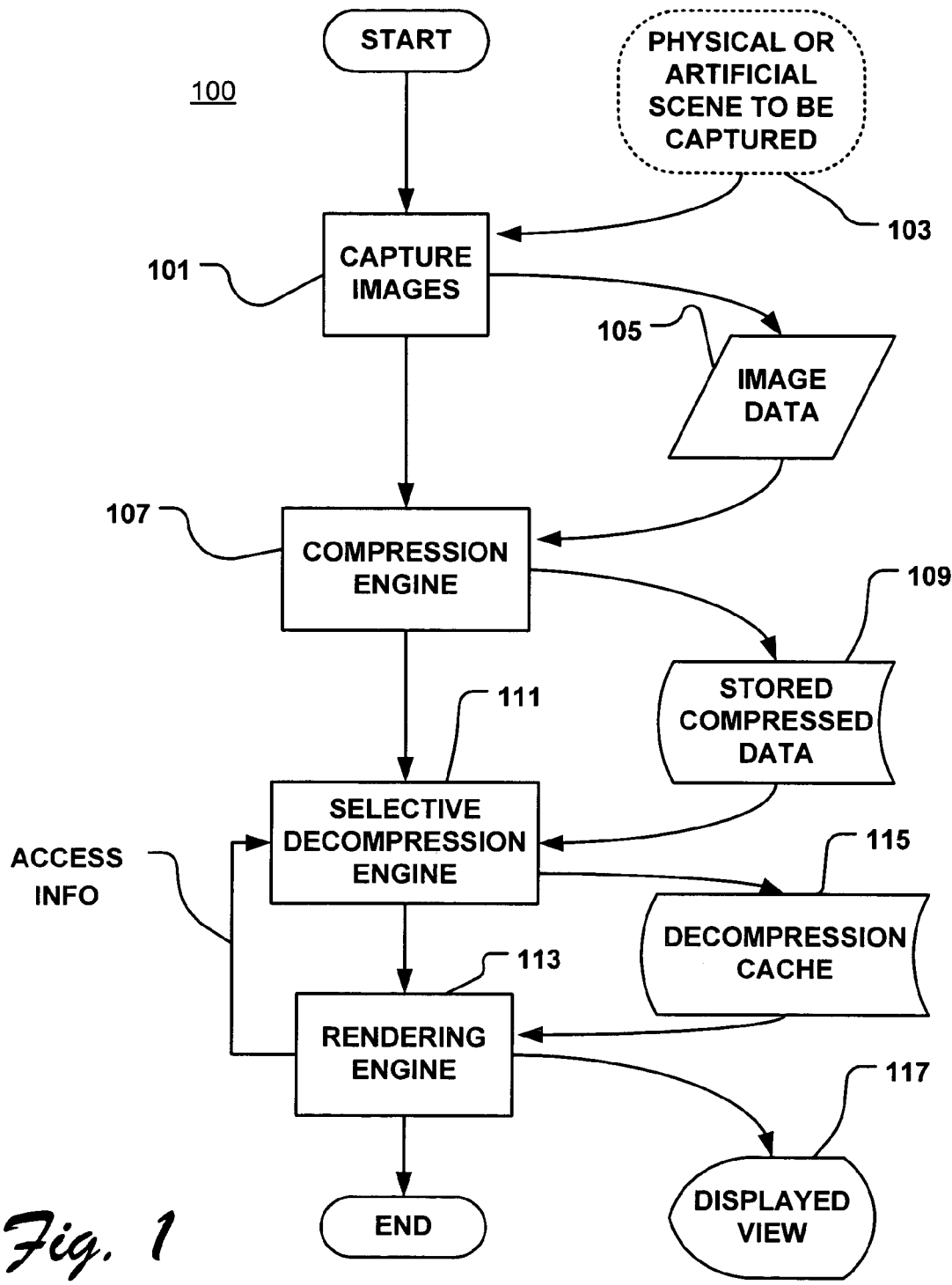
FIG. 1 is a block diagram depicting an exemplary arrangement that generates or otherwise accesses image-based rendering (IBR) data, the arrangement includes a compression engine, a selective decompression engine and a rendering engine.

Reference is now made to FIG. 1, which is a block diagram depicting an arrangement 100 that generates or otherwise accesses COM data 105. The arrangement includes a capture module 101, a compression engine 107, a selective decompression engine 111, and a rendering engine 113.

Capture module 101, which is optional, operates to capture a mosaic image scene 103. Scene 103 can be a physical scene captured by a camera or a plurality of cameras, an artificial scene created by an artist using a graphics system and shot by a virtual camera, or a mixture of the two. Capture module 101 essentially scans the scene 103 and creates a plurality (e.g., an array) of digitized mosaic images that form COM data 105. An exemplary capture module 101 for generating COM data is described in the Background section above, further sections below, and in the above-referenced patent application entitled, "Rendering With Concentric Mosaics".

With respect to FIG. 1, capture module 101 is optional in that COM data 105 may also be a data file that is simply provided to arrangement 100 by some other arrangement. Regardless as to how it is generated, COM data 105 is provided to compression engine 107.

Preferably, compression engine 107 is configured to compress the image data by at least an order of magnitude. Accordingly, if the image data 105 for a plurality of mosaics of scene 103 is hundreds of megabytes, compression engine 107 reduces the quantity of image data to megabytes or tens of megabytes, depending on the available memory and desired rendering quality. Such compression makes it feasible for a computing system, such as, a personal computing system described hereinafter with reference to FIG. 2, to store compressed COM data 109. Compressed COM data 109 can also be transported as a bitstream over one or more communication services.

Decompression engine 111 receives and/or otherwise accesses compressed COM data 109. Decompression engine 111 operates in a selective manner in response to access information from rendering engine 113. The access information identifies portions of the compressed COM data in need of decompression and subsequent rendering.

As such, there is no need to decompress the entire mosaic data during the rendering stage. At any time, only a specified view of the concentric mosaic scene is rendered, which requires the accessing of only a portion of compressed COM data 109 depending on such parameters as the location of the viewpoint, viewing direction and the field of view.

Accordingly, rendering engine 113 sends the requisite access information to decompression engine 111, which first looks for the decompressed COM data in a local cache 115. If the required COM data is already available in local cache 115, then the required decompressed COM data is returned to the rendering engine immediately. Otherwise, decompression engine 111 accesses and decompresses portions of the stored compressed COM data 109 not already in cache 115, as required. The newly decompressed COM data is stored in cache 115.

The requested view data having been cached is then processed by rendering engine 113 based on the timing of the interactions between decompression engine 111 and rendering engine 113. In this manner, rendering engine 113 essentially builds a 2D image of the 3D scene for the desired or selected view and displays the view through a monitor 247 (see FIG. 2) or the like.

Computing Environment

Figure 2:
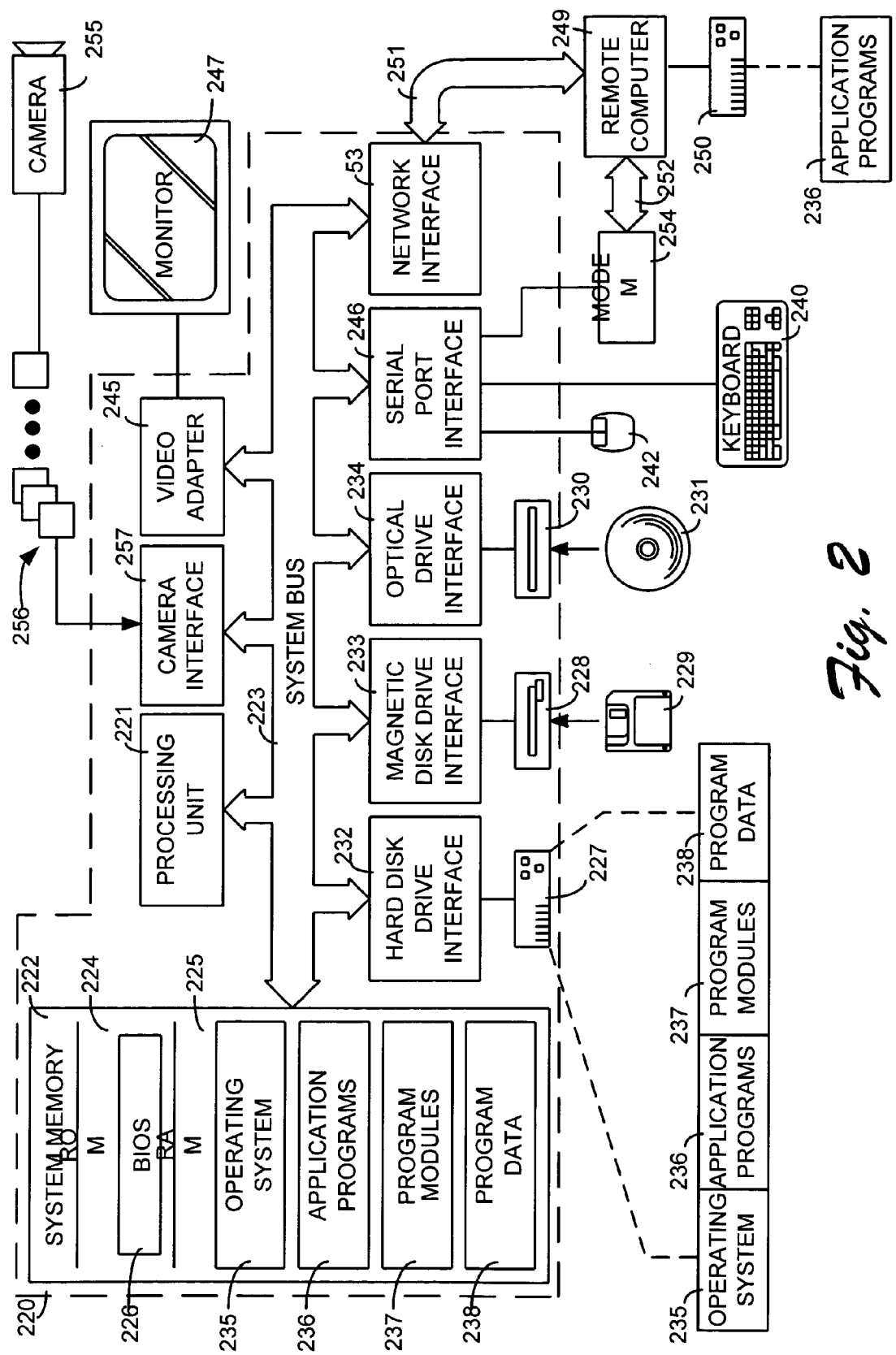
FIG. 2 is a block diagram depicting an exemplary computing system environment suitable for use with the arrangement of FIG. 1.

Reference is now made to FIG. 2, which is a block diagram of an exemplary computing system 200 suitable for use with the arrangement of FIG. 1.

Computing system 200 is, in this example, a personal computer (PC), however, in other examples computing system may take the form of a special-purpose device, an appliance, a handheld computing device, a cellular telephone device, a pager device, etc. Moreover, the arrangement in FIG. 1 can be distributed between a plurality of computers/devices.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). Of particular significance to the present invention, a camera 255 (such as a digital/electronic still or video camera, or film/photographic scanner) capable of capturing a sequence of images 256 can also be included as an input device to computing system 200. The images 256 are input into computing system 200 via an appropriate camera interface 257. This interface 257 is connected to the system bus 223, thereby allowing image data to be stored in RAM 225, or one of the other data storage devices. It is noted, however, that image data, such as COM data, can be input into computing system 200 from any of the aforementioned computer-readable media as well, without requiring the use of the camera 255.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

The Concentric Mosaic Scene

Figure 5:
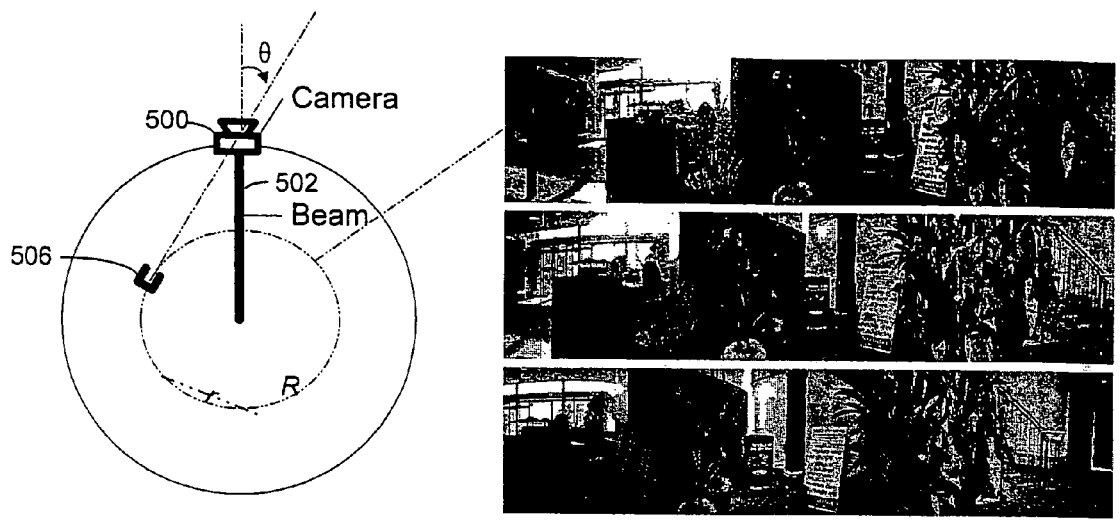
FIG. 5 is a graphical representation illustrating one conventional technique for generating IBR data as concentric mosaic images.

A concentric mosaic (COM) scene can be captured by mounting a camera 500 at the end of a beam 502, and shooting images at regular intervals as the beam rotates, as shown in FIG. 5. Let the camera shots taken during the rotation be denoted as c(n,w,h), where n indexes the camera shot, w indexes the horizontal position within a shot, and h indexes the vertical position. Let N be the total number of camera shots, W and H be the horizontal and vertical resolution of each camera shot, respectively. The entire concentric mosaic data set can be treated as a series of camera shots $F_n=\{c(n,w,h)|w,h\}$, or alternatively can be interpreted as a series of rebinned panoramas $P_w=\{c(n,w,h)|n,h\}$ which consist of vertical slits at position w of all camera shots. Thus, panorama $P_w$ can be considered as taken by a virtual slit camera rotating along a circle co-centered with the original beam with a radius $r=R \sin \theta$, where R is the radius of the rotation beam, r is the equivalent radius of the slit camera, and $\theta$ is the angle between ray w and the camera normal. Since the entire data volume $P_w$w=0, . . . , W-1 can be considered as a stack of co-centered mosaic panoramas with different radius, it gets the name of the concentric mosaics. Here, FIG. 6 includes three exemplary concentric mosaic images for an office space taken from progressively different positions.

Figure 6:
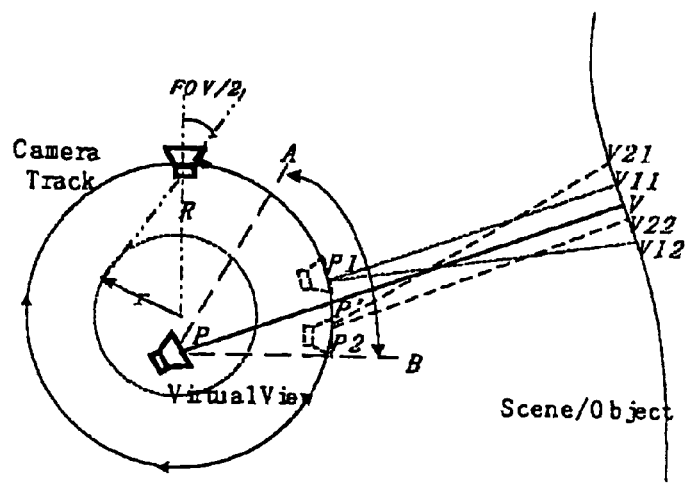
FIG. 6 is a graphical representation illustrating one conventional technique for rendering a selected view of a scene based on concentric mosaic image data, such as that generated in FIG. 5.

Rendering concentric mosaics involves reassembling slits from the captured dataset. As shown in FIG. 6, let the horizontal field of view of the camera be FOV, the concentric mosaic representation can render any arbitrary view within an inner circle with radius $r=R \sin(FOV/2)$. Let P be a novel viewpoint and AB be the field of view to be rendered. The view can be split into multiple vertical slits, and each slit can be rendered independently. A basic hypothesis behind concentric mosaics rendering is that the intensity of any ray does not change along a straight line unless blocked. Thus, when a slit PV is rendered, a search can be made for the slit P'V in the captured dataset, where P' is the intersection point with the camera track. Because of the inherent discrete sampling associated with the COM image capturing process, the exact slit P'V might not be found in the captured dataset. Thus, for example, the four sampled slits closest to P'V may be $P_1V_{11}$, $P_1V_{12}$, $P_2V_{21}$ and $P_2V_{22}$, where $P_1$ and $P_2$ are the two nearest captured shots, $P_1V_{11}$ and $P_1V_{12}$ are the slits closest to $P_1V$ in direction in shot $P_1$, and $P_2V_{21}$ and $P_2V_{22}$ are closest to $P_2V$ in shot $P_2$. One approach would be to choose only the slit that is closest to P'V from the above four in an effort to approximate the intensity of PV. However, a better approach is to use a bilinear interpolation or like process, wherein, for example, all two or more slits are employed to interpolate the rendered slit PV. Moreover, the environmental depth information may be used to determine the best approximating slits and alleviate the vertical distortion. Further information on concentric mosaics rendering may be found in the above-referenced patent application entitled, "Rendering With Concentric Mosaics".

Thus, by recording all the mosaic images, one can equivalently recreate a dense 3D walkthrough view of the captured scene within the circle R·sin(FOV/2). A single mosaic image provides the center panorama of the scene that enables the viewer to rotate at the center of the camera's track. The remaining mosaic images then supply the additional information required for rendering the 3D walkthrough.

Since the original data of the COM scene is three-dimensional, with strong correlation among different mosaic images, a 3D wavelet scheme can be provided for the compression of the COM scene.

Thus, in accordance with certain implementations of the present invention, several compression schemes will now be presented, each of which includes a data rebinning process. Those skilled in the art will recognize that a data rebinning process may be implemented as part of a data pre-processing stage and/or during real-time processing of the COM data and adapted for use with other types of IBR data.

By way of example, the data rebinning processes described below may be performed in advance of a 3D wavelet transform process, a scalar quantizer/embedded block coder process, and a bitstream assembler process. With the exception of the data rebinning process, each of these exemplary processes is described in greater detail below and further described in the above-referenced article and associated patent application of L. Luo et al.

Figure 3:
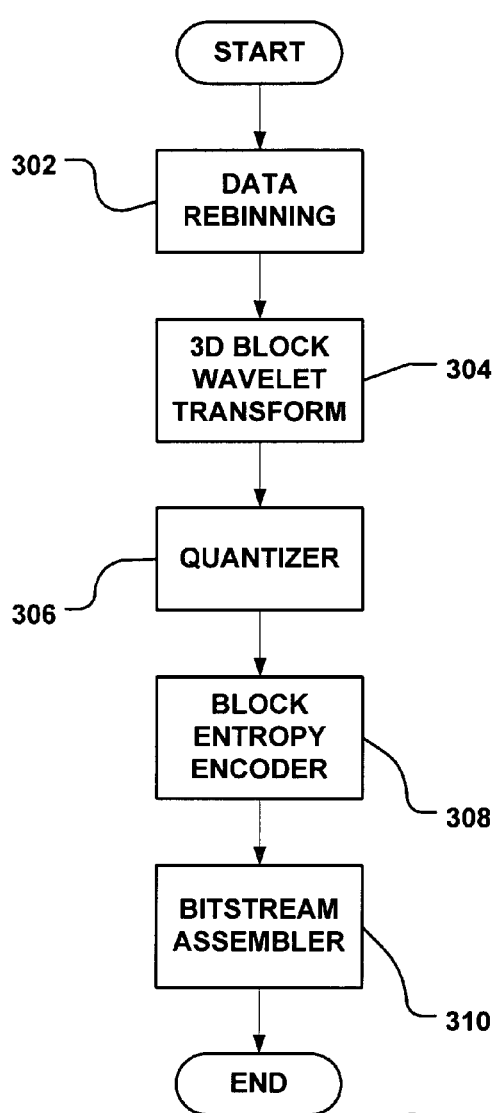
FIG. 3 is a block diagram depicting an exemplary compression engine as in FIG. 1.

These processes are depicted in FIG. 3., which illustrates an exemplary method for use in compression engine 107, as in FIG. 1. Here, the logical operations performed by the compression engine include a data rebinning step 302, a 3D wavelet transform step 304, a quantizer step 306, a block entropy encoder step 308, and a bitstream assembler step 310.

Data Rebinning Process

Figure 8:
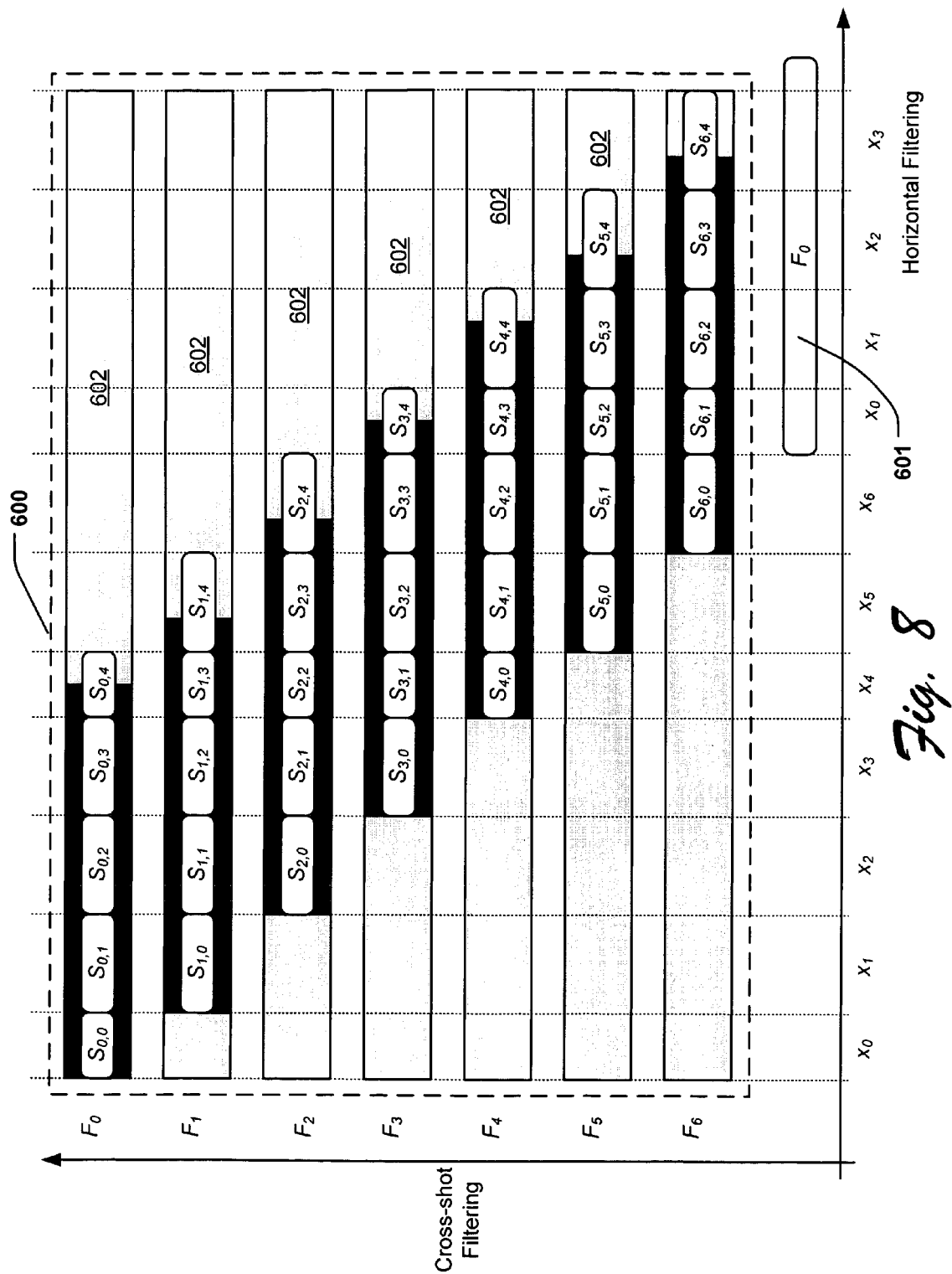
FIG. 8 is a graphical depiction of an extended data set based on the original data set in FIG. 7, wherein the plurality of frames of concentric mosaic image data have been selectively horizontally aligned based on one or more displacement vectors, and each of the frames includes a plurality of selectively identified portions of frame image data and further selectively determined empty region(s).
Figure 9:
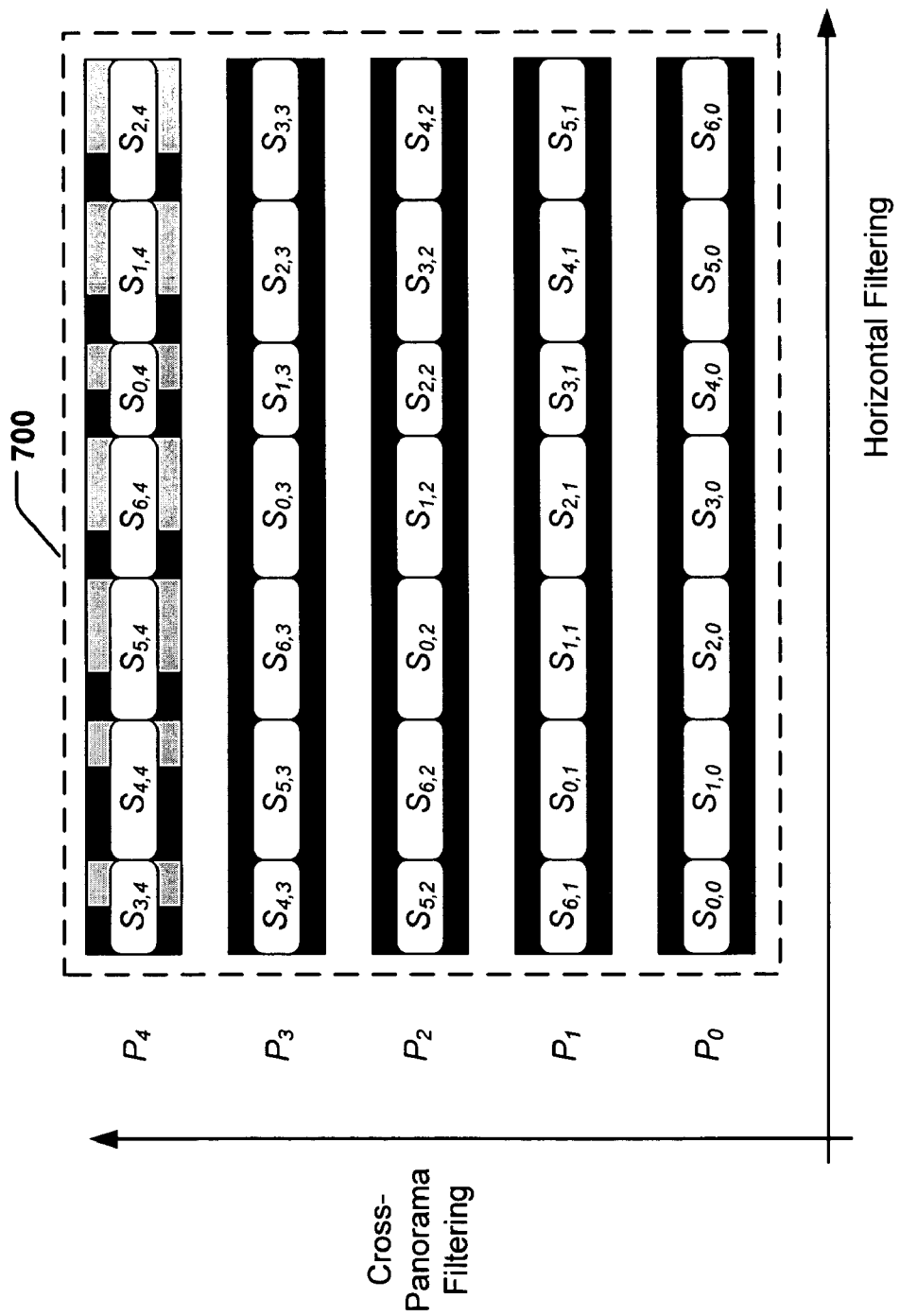
FIG. 9 is a graphical depiction of a reduced data set based on the extended data set in FIG. 8, wherein the reduced data set includes a plurality of aligned panoramas, each of which includes selected portions of the frame image data as identified and shown in FIG. 8.

Reference is now made to FIG. 7, which graphically depicts seven concentric mosaic image shots $F_0, F_1, \ldots, F_6$. Here, each black horizontal line corresponds to one captured image. In this example, the vertical direction in each of the images is not shown since the main concern to be addressed/exploited is the horizontal translation. In FIGS. 8 and 9 these exemplary images are depicted following a horizontal shot filtering process and a selective rebinning process, respectively.

In the above-referenced article and associated patent application of L. Luo et al., the 3D data volume of the concentric mosaics was compressed through global alignment of the panorama and 3D wavelet coding. However, filtering in the temporal direction (mentioned as across the mosaic image shots, as there is no time domain in the concentric mosaic) has not proven to be extraordinarily efficient, and thus the compression performance of the 3D wavelet codec tends to suffer somewhat at times.

In recognition of the significant role of motion compensation in 3D wavelet compression processes, a search was made for a more efficient de-correlation scheme along the cross-shot direction. Since, as described above, the concentric mosaics assume static scenery and the camera is slowly swinging within a planar circle, the motion between two successive images is predominantly horizontal translation, with little or no vertical motion. Hence, the dominant global horizontal translation vectors between each pair of consecutive image shots can be calculated.

Let $x_n$ denote the horizontal displacement between captured shot $F_n$ and $F_{n+1}$, where n ranges from 0 to N-2. Since the shots are circularly captured, shot $x_n$ is right next to shot $x_{N-1}$. Let $x_{N-1}$ denote the displacement vector between frame $F_0$ and $F_{N-1}$. Note, that the horizontal displacement vectors may not always be equal for all frames, since they are inversely proportional to the distance of the shot object, i.e., larger for shots with a close-by object, and smaller for shots with faraway background.

With this in mind, the correlation between neighboring shots can be maximized by horizontally aligning them according to a calculated or otherwise specified displacement vector, as shown in FIG. 8. Here, this approach is termed horizontal shot alignment.

In this example, the seven concentric mosaic image shots $F_0, F_1, \ldots, F_6$ of FIG. 7 are shown in skewed positions within an extended data set 600. As before, the vertical direction of the image is not shown since the main concern lies with horizontal translation. An additional virtual image $F_0$ 601 is drawn below the last image $F_6$ to show/represent the circular capturing activity of camera 500.

As shown in FIG. 8, additional empty space 602 having selected data fill/padding (as illustratively depicted by a gray tone) has been added to each of the seven concentric mosaic image shots $F_0, F_1 \ldots, F_6$. Furthermore, each of the seven concentric mosaic image shots $F_0, F_1, \ldots, F_6$ is shown as consisting of a plurality of portions of COM data, wherein some of the portions also include some fill/padding data from the empty zone 602.

For example, concentric mosaic image shot $F_0$ includes five portions identified as $S_{0,0}, S_{0,1}, S_{0,2}, S_{0,3}$, and $S_{0,4}$. The purpose for this nomenclature is to clarify the exemplary rebinning process in the sections below. Note, that in this example, portion $S_{0,4}$ (identifying Frame 0, Stripe 4) includes both COM data and fill/padding data from empty zone 602.

Thus, following horizontal shot alignment, the concentric mosaics form a skewed data volume in extended data set 600, which, without any potential fill/padding data in empty zone 602, may be encoded by a 3D wavelet codec with horizontal, vertical and cross-shot filtering with a non-rectangular (i.e., arbitrary shape) region of support. The correlation across image shots is expected to improve, however, since the resultant data volume is highly sparse and is not rectangular, the compression efficiency may be compromised.

In accordance with certain further aspects of the present invention, however, data rebinning step 302 goes beyond horizontal shot alignment. Here, the basic idea is to cut and paste, i.e., to rebin, the frames in extended data set 600 into a reduced data set 700 of corresponding panoramas. This can be visualized, for example, by essentially pushing the extended data set downward, in a manner that forms corresponding panoramas as depicted in FIG. 9. FIG. 10, which will be described later, provides yet a further graphical representation of this exemplary rebinning process.

For now, consider as an example, the first panorama $P_0$ of FIG. 9. As shown panorama $P_0$ includes those portions of concentric mosaic image shots $F_0, \ldots, F_6$ that are identified as being in the $0^{th}$ stripe and are visually capable of being "pushed downward" through the stacked extended data set. Thus, in this example, panorama $P_0$ includes (in order) portions $S_{0,0}, S_{1,0}, S_{2,0}, S_{3,0}, S_{4,0}, S_{5,0}$, and $S_{6,0}$. Similarly, visually assuming these aforementioned portions are no longer in extended data set 600, the next panorama $P_1$ that can be pushed down includes (in order) portions $S_{6,1}, S_{0,1}, S_{1,1}, S_{2,1}, S_{3,1}, S_{4,1}$, and $S_{5,1}$. Notice that the right part of the data volume is warped to the left due to the circular nature of the camera shots.

This is one type of a data rebinning process. Four exemplary implementations for data rebinning step 302 are described herein. These rebinning processes are termed: 1) simple rebinning, 2) smart rebinning with data padding, 3) smart rebinning for use with an arbitrary shape wavelet transform, and 4) Rebinning Of SlitS (ROSS). The first three of these are associated with wavelet transform codecs and the like, while the fourth one is associated with still image codecs and the like.

Before describing simple rebinning and ROSS processes, an exemplary smart-rebinning process will be described and its use in techniques 2) and 3) above will be pointed out.

As depicted in FIG. 8, the original COM image shots are selectively divided into groups of vertical slits according to the horizontal displacement vectors. A group of vertical slits with the horizontal width of the displacement vector is called a stripe. For example, in FIG. 8, portions of the COM data are defined between the vertical dashed lines. The stripe is the smallest integral unit used in the smart-rebinning process.

Let the stripe be denoted by $s_{n,j}$, where n indexes the image shot $F_n$ that the stripe belongs to, and j indexes the stripe within $F_n$. The length of the first stripe is $x_n$, the horizontal displacement vector between frame $F_n$ and $F_{n+1}$. The length of the $j^{th}$ stripe is $x_{(n+j) mod N}$, correspondingly. The number of stripes is not constant for all frames: it is inversely proportional to the horizontal displacement vector. Therefore, there are few stripes for a frame with a close-by object, and more stripes for that with faraway background.

Let the maximum number of stripes for all frames be S. The stripes are then essentially cut and pasted (i.e., the data is rearranged accordingly) to form the rebinned panorama set. A total of S panoramas are obtained with equal horizontal length $x_0 + x_1 + \ldots + x_{N-1}$. The first rebinned panorama $P_0$ is constructed by concatenating the first stripes of all frames, which is shown in FIG. 10 as the trace of the dotted circles. In general, a smart-rebinned panorama $P_i$ consists of the $i^{th}$ stripes of all frames cut and paste sequentially, with the $i^{th}$ stripe of frame $F_0$ at the $i^{th}$ slot:

$$P_i = \{s_{(-i) mod N, i}, s_{(-i+1) mod N, i}, \cdots, s_{(-i+N-1) mod N, i}\},$$
$$i = 0, 1, \ldots, S$$

In FIGS. 8 through 10, the sample concentric mosaic image array has a total of 7 frames with each frame having 12 slits. The 7 horizontal displacement vectors for the frames are 2, 3, 3, 3, 2, 3 and 3 respectively. This is shown most clearly in FIG. 10. In this example, a frame will have at most 5 stripes. As a result, the mosaic image array is rebinned into 5 panoramas, as shown in FIG. 9, with width 2+3+3+3+2+3+3=19. The first panorama includes the first stripes from all shots. The second panorama includes the second stripes from all shots. To align the first and the second panoramas, the second panorama is rotationally shifted so that the stripe from frame $F_{N-1}$ is at the head. Some portions of the stripes in panorama $P_4$ contain no data (or may contain fill data), as the corresponding image shot do not have a full $5^{th}$ stripe.

Figure 12:
FIG. 12 is a pictorial representation of a volumetric portion of a reduced data set associated with a Kid's scene example.

The resulting smart-rebinned panoramas are thus not of rectangular region of support. FIG. 12 illustrates the non-rectangular region due to missing/fill data (illustrated as a solid black region). Special handling for those empty regions is addressed in the next section with regard to the type of wavelet transform. Basically, either fill data can be provided where needed within the panorama data set and a standard 3D wavelet transform used, or an arbitrary-shape wavelet transform can be used.

Close inspection will show that in the smart-rebinning approach, filtering across the panorama is equivalent to filtering across the image shots in the horizontal shot alignment approach shown in FIG. 8. However, the horizontal filtering is changed from filtering within the image shot to filtering within the rebinned panorama. The newly generated panorama $P_i$ is highly correlated horizontally, because each stripe includes successive slits in one original shot image, and two neighbor stripes are smoothly connected since they are from matching stripes in neighboring concentric mosaic image shots. Consequently, horizontal filtering is still significantly efficient. Furthermore, with smart rebinning, the unfilled regions of the skewed dataset is largely reduced, which makes the compression much more efficient.

A degenerated approach is to restrict all horizontal translation vectors to be exactly the same:

$$x_0 = x_1 = \ldots = x_{S-1} = x$$

This approach is simple rebinning. Here, all of the image shots now have the same number of stripes. If there are unfilled slits at the last stripe, they are simply filled by repeating the last slit. Hence, a rectangular region of support may be formed by rebinning the stripes into panoramas.

This approach is similar to the concentric mosaic formation of Shum et al. in "Rendering With Concentric Mosaics," which obtains one slit from all shots for each of the concentric mosaic. The main difference is that, here, multiple slits are obtained from each shot to rebin the panorama.

Figure 13:
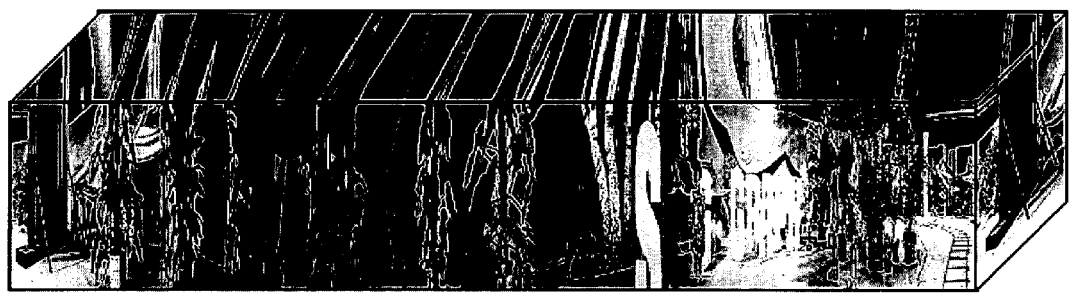
FIG. 13 is a pictorial representation of a volumetric portion of an original data set associated with the Kid's scene example of FIG. 12.

A smart rebinned panorama volume is shown in FIG. 12, while the volume of the original concentric mosaics is shown in FIG. 13 as a comparison. The rebinned concentric mosaics form a cube, with the front view showing a concentric mosaic, the side view a camera shot, and the top view a cross-section slice at a certain height. In contrast, the smart rebinned panorama set in FIG. 12 is a volume of non-rectangular support, and the black region in FIG. 12 identifies unsupported region (e.g., empty or fill).

It is noted that the area with a smaller region of support is closer to the capturing camera, because it has a larger horizontal displacement vector, and thus contains small number of stripes. In comparison with the concentric mosaics, the smart-rebinned panorama appears to be more visually smooth and natural looking, as it adjusts its sampling density according to the distance of shot to object, and maintains a relative uniform object size as seen by the camera.

Figure 14:
FIG. 14 is a pictorial representation of a plurality of rebined panoramas at the same horizontal location associated with the Kid's scene example of FIG. 12.

More importantly, the smart rebinned panoramas have strong correlation across the panoramas. A set of rebinned panoramas at the same horizontal location is extracted and shown in FIG. 14. Here, it can be observed that most objects in the rebinned panoramas are well aligned. Only a few close-by object/environment shows difference due to the gradual parallax transition among rebinned panoramas. The data volume can thus be efficiently handled by a 3D wavelet transform.

In fact, the rebinned panorama, belongs to a general category of multi-perspective panoramas that are popular recently in computer graphics domain, such as the manifold mosaics, multiple-center-of-projection image and circular projection.

A multi-perspective panorama extends the conventional panorama by relaxing the requirement of having one common optical center and allows several camera viewpoints within a panorama. The idea of multi-perspective panorama construction via cutting and pasting stripes is known and has been applied, for example, to enable stereo viewing where stripes taken from the left side of each image shot generates the right eye panorama and those from the right gives the left eye viewing. However, in contrast to having only one or two panoramas generated for such a specific graphical application, the methods and arrangements described herein generate a whole set of rebinned panoramas to provide a dense representation of the environment, and to efficiently compress the concentric mosaic data set.

Since the complexity of a 3D wavelet transform approach can be significant, in accordance with certain further aspects of the present invention, another rebinning approach is provided for use with conventional still image coding techniques. This approach is called Rebinning Of SlitS (ROSS).

Here, for example, each COM image is split into vertical slits that are also the elementary access units in the COM scene rendering. Instead of using frame prediction or 3D wavelet to explore the redundancies between image shots, the slits are rebinned into a huge 2D image, which may then be encoded with a still image compression algorithm.

Consequently, the rebinning operation converts the cross-frame redundancy into intra-frame spatial redundancy, which may be effectively explored by a still image compression algorithm. This approach is superior to many existing methods in compressing the concentric mosaic scene. Furthermore, with the use of an algorithm supporting random access, such as, e.g., JPEG2000, the compressed COM scene can be easily accessed and rendered.

Figure 15:
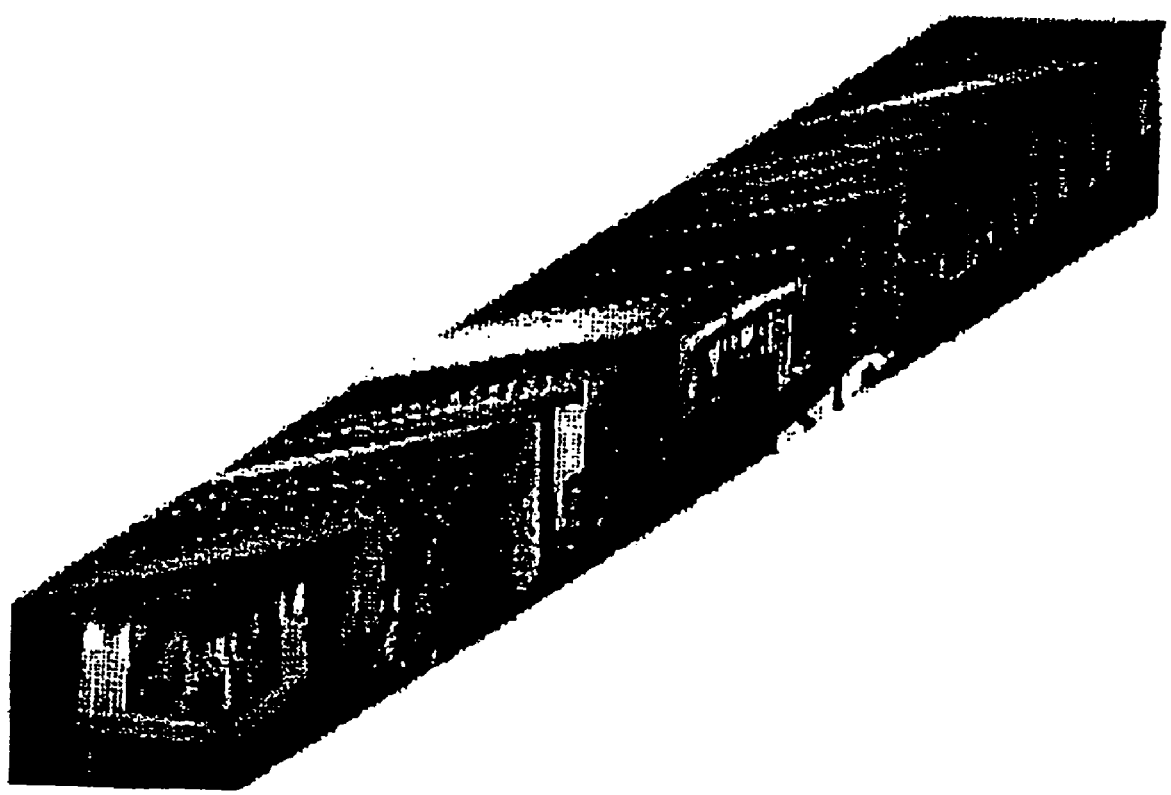
FIG. 15 is a pictorial representation of a plurality of image shots of concentric mosaics.

A sample COM scene is shown in FIG. 15. The ROSS process splits each shot of the COM scene into vertical slits or columns, and combines them into a huge 2D image panorama. The goal is to generate an image panorama which comprises all the content of the original COM scene and yet as smooth as possible.

Let $C=\{C(n,m,k)|n=1\ldots N, m=1\ldots M, k=1\ldots K\}$ be the original COM scene, where n, m and k index the picture shot, the slit, and the point within the slit, respectively. N is the number of shots in COM scene, with each shot of size M×K. Let $F=\{f(p,k)|p=1\ldots P, k=1\ldots K\}$ be the resultant panorama, where P is the number of slits in the panorama, which satisfies:

$$P=N\times M.$$

Let G(n,m) be an index function that provides the location of the slit C(n,m,k) in the panorama.

An exemplary ROSS algorithm can be described as follows:

Step 1. Initialization

Initialize the set F with all the slits from the first concentric mosaic shot, i.e., $$f(m,k)=(l,m,k) \text{ where } m=1\ldots M, k=1\ldots K.$$

Step 2. Insertion of Slits One By One Into F.

Enumerate shot by shot, and within each shot, enumerate slit by slit. For each slit C(n,m,k) in consideration, it is inserted into F between slits p and p+1 where the inserted point p can be calculated as follows:

$$\min_p \sum_{k=1}^{K} \{|f(p,k)-C(n,m,k)|+|f(p+1,k)-C(n,m,k)|\}$$

In other words, the current slit is inserted into a position where the sum of absolute difference between the slit and its two neighboring slits in the panorama is minimized. An exhaustive search may lead to an optimal solution, however, it is computationally expensive. Assuming that the COM scene is shot with a clockwise swinging camera, and shot C(n,m,k) precedes C(n+1,m,k), the search complexity can be reduced with an added constraint that p>G(n−1, m) and p>G(n,m−1). With the prior information that the COM camera swings clockwise, it will be known that the panorama grows at the right when more and more camera shots are added, thus the above constraint can be used to speed up the search.

Step 3. Coding of the Rebinned Panorama

After the above rebinning process, a still image coder is used to compress the huge 2D panorama. By way of example, in early experiments, a JPEG 2000 VM 5.0 was selected due at least in part to its high compression ratio and rich feature set of the compressed bit-stream. However, other state-of-the-art still image coders, such as a rate-distortion optimized embedding (RDE) coder, may be used as well.

Step 4. Encoding of the Mapping Index.

In early experiments, an inverse of the mapping index was actually encoded, $G^{-1}=(p)$, $p=1...P$, which records the source shot and slit number of each rebinned slit f(p,k).' Note that with constraint (1), the left-to-right order of slits in the same shot is preserved, i.e., if slit A is on the right of slit B of the same source COM shot, the mapping of slit A will be on the right of slit B in the rebinned panorama. Consequently, there was only a need to record the source shot number of $G^{-1}(p)$. To further reduce the entropy of the mapping index coding, the second order differentials of the shot number of $G^{-1}(p)$ is calculated:

$$H(p)=G^{-1}(p)-2\times G^{-1}(p-1)+G^{-1}(p-2),$$

and the result was compressed by a Zip program. With the above operation, the entropy of the mapping index has been reduced to around 2.75 bits per slit, which occupies only a small portion of the overall bit-stream.

3D Wavelet Transform Process

For degenerated simple rebinning, a straightforward 3D wavelet encoding algorithm may be employed in process block 304. For example, a conventional 3D wavelet codec with arithmetic block coding can be used. Here, the data volume is decomposed by a multi-resolution 3D wavelet transform process. The resulting wavelet coefficients can then be divided into fixed size blocks, embedded encoded, and assembled with a rate-distortion optimization criterion, for example, as described in greater detail in later sections.

For general smart-rebinned panoramas, a 3D wavelet coding algorithm that handles a data volume with arbitrary region of support is required. One approach is to pad or fill the unfilled arbitrary region (see regions 602 in FIG. 8) of support to the tightest rectangular volume containing it and then apply a rectangular 3D wavelet transform and coding algorithm to the padded data volume, similar to the low-pass extrapolation (LPE) technique adopted in MPEG4.

Thus, for example, the unsupported regions are first filled with the average pixel value of the supported/unsupported region boundary, and then a low-pass filter is applied only in the unsupported region several times. Since in the unsupported region, all pixel values are set to be the same initially, the effect of the low-pass filter is primarily at the boundary, where a gradual transition is built up.

After the wavelet transform, coefficients in the unsupported regions will be mostly zeros, except at the boundary. The padded volume is then compressed with the 3D wavelet codec. Since the number of wavelet coefficients after padding is still more than the number of pixels in the supported region, the padding consumes bit budget in coding, therefore the compression performance will be somewhat affected. The advantage is that the padding involves the least change in the 3D wavelet codec, and is very easy to implement. Moreover, although the padding operation adds complexity in the encoder, it does not affect the decoder, which simply ignores the unsupported region.

With symmetrical extension, the wavelet transform may generate exactly the same number of transform coefficients as the number of pixels in the supported region. Therefore, another feasible solution is not to use padding at all. An arbitrary shape wavelet transform, as described in October, 1998 in the "Arbitrary Shape Wavelet Transform With Phase Alignment" paper at the International Conference of Image Processing (ICIP-1998), Chicago, Ill. by J. Li and S. Lei, will be used directly on the irregular region of support. Here, for each directional wavelet transform, a set of straight lines in that direction intersects the supported region and creates several segments. Each segment is then decomposed separately using a bi-orthogonal symmetric filter with symmetric extensions into the exact number of wavelet coefficients. The coefficients are then stored in the wavelet domain, and the region of support for the wavelet coefficients is noted.

The process can be recursively applied for multi-resolution decomposition, and transform the arbitrarily supported concentric mosaic volume into an exact number of wavelet coefficients. A block arithmetic coder with arbitrary region of support in the wavelet domain is then used to compress the transformed coefficients. Here, the codec is referred to as the 3D arbitrary shape wavelet codec. It has been observed that the arbitrary shape wavelet transform and coding is slightly superior in compression performance than padding the unsupported region. However, it is also more complex to implement.

Attention is now drawn back to FIG. 3, and additional information about the 3D wavelet transform process of process block 304 is provided. In process block 304, a 3D separable wavelet transform is applied on the concentric mosaic (COM) image array to de-correlate the images in all three dimensions, and to compact the energy of the image array into a few large coefficients. In addition to energy compaction, the multi-resolution structure provided by the 3D wavelet transform may also be used to access a reduced resolution mosaic image array during rendering. This is useful when there is not enough bandwidth or computation power to access the full resolution of the COM scene, or the display resolution of the client device is low.

The entire COM scene will likely be too large to be loaded into memory simultaneously to perform the 3D wavelet transform. Therefore, for the sake of memory saving and computational simplicity, a 3D lifting scheme with a frame/line buffer can be implemented.

If the data rebinning process is a ROSS rebinning process, then instead of the 3D wavelet transform process, process block 304 would include an applicable 2D coding process.

Block Scalar Quantization And Embedded Block Coding

Referring again to FIG. 3, the output from wavelet transform step 304 is provided to block quantizer step 306. Block quantizer step 306 causes the wavelet-transformed coefficients to be divided into cubes, compressed by a scalar quantizer and output to embedded block entropy encoder step 308.

In block quantizer step 306, the compressed block bitstreams are first buffered, and then assembled by a rate-distortion optimized assembler after all blocks have been encoded. Even though the quantization and entropy coding are performed on a block-to-block basis, the wavelet transform operates on the entire COM data, therefore, no explicit blocking artifact is visible in the decoded COM scene.

The block coding structure selected for the COM scene compression has several advantages. For example, such a block coding structure can benefit from local statistical variations. The statistical property may not be homogeneous across the entire COM data set. Since each block of coefficients is processed and encoded independently, the encoder may tune to local statistical properties, and thus improve coding performance. The variation of the statistics across the COM scene may also be used in bitstream assembler operation 310, and bits may be distributed in a rate-distortion optimized fashion across the COM scene.

Another advantage of the block coding structure is that it provides for easy random access. A selected portion of the COM scene can be randomly accessed without decoding the entire COM data set, because of the block quantization and entropy coding. From the accessed region required by the rendering unit, one may derive the related blocks using the wavelet basis and wavelet decomposition scheme. Only the bitstreams of the accessed blocks are decoded.

Yet another advantage of the block coding structure is its relatively low memory requirement. The block coding structure eliminates the need to buffer the entire volume of COM coefficients. There is still a need to buffer the compressed bitstream of coefficients, however, doing so does not require too much memory. Moreover, the decoder side (shown in FIG. 4) requires even less memory since the compressed bitstream is only partially accessed and decoding is only performed on those blocks required to render the current view.

Many implementations of the entropy encoder are feasible. Due to the use of the bitstream assembler, the entropy coder should provide an embedding property, such that the compressed block bitstream can be truncated at a later stage with a good compression performance at such reduced bit rates. See, e.g., the above-referenced article by L. Luo et al., entitled "Compression Of Concentric Mosaic Scenery With Alignment And 3D Wavelet Transform," and associated patent application for information on various bitplane/run-length coders, including a tree coder, Golomb-Rice coder and a context-based arithmetic coder.

Rate-Distortion Optimized Bitstream Assembler

After all the blocks of coefficients have been entropy encoded, the bitstream assembler step 310 of FIG. 3 assembles the bitstream and builds a file structure. The bitstream assembler is essentially used to optimally allocate the bits among different blocks based on the rate-distortion curves of individual blocks obtained during the embedded coding stage. A further functionality of the bitstream assembler is to assemble the compressed concentric mosaic bitstream. For bitstream random access, an index table or other form of identifying information can be encoded, which records the encoded bitstream length of each individual block, etc. The index table and the compressed bitstream of each block coefficients form the compressed concentric mosaic scene.

Decompression and Rendering Operations

Figure 4:
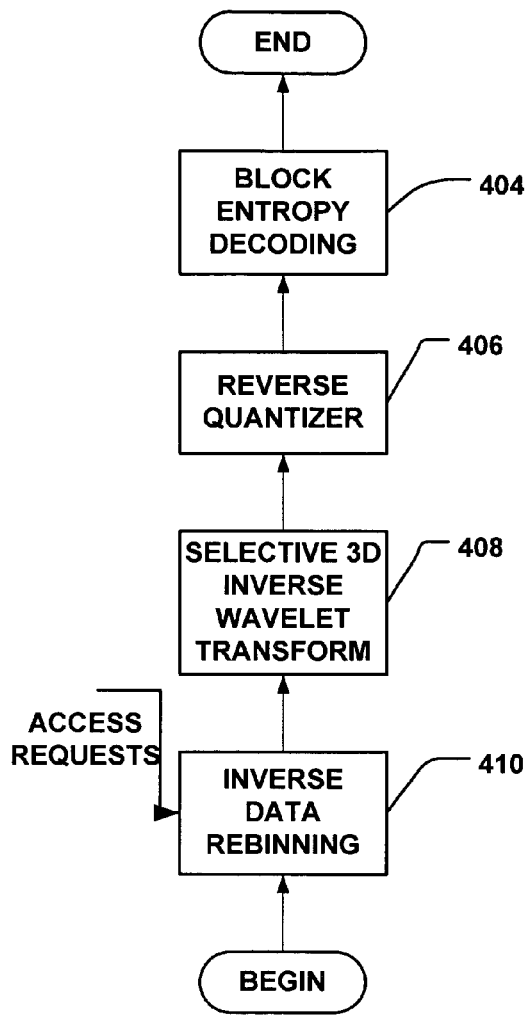
FIG. 4 is a block diagram depicting an exemplary selective decompression engine as in FIG. 1.

As shown in FIG. 4, the decompression and rendering operations are substantially procedurally opposite to the rebinning and compression operations depicted in FIG. 3.

Here, the desired or new view is split into a number of columns, and for each column, a corresponding column in the concentric mosaic scene is found. If, for example, bilinear interpolation is used, then as many as four columns may be accessed, and the new column bilinearly interpolated from the four accessed columns.

An exemplary rendering operation is described in the above-referenced application entitled "Rendering With Concentric Mosaics." While one may decompress the concentric mosaic bitstream and then render it, this tends to require a significant amount of memory. Moreover, the rendering system will likely experience a fairly lengthy start delay to decompress the compressed concentric mosaic bitstream. Hence, a better implementation is to combine a selective decompression operation with the rendering operation. A number of column access requests $f(n_i, m_i, y)$, with $i=1, \ldots, k$ are sent by the rendering engine 113 (FIG. 1) to the selective decompression engine 111 (FIG. 1). It is the task of the selective decompression engine 111 to provide the rendering engine 113 with the accessed columns.

FIG. 4 illustrates the logical operations of selective decompression engine 111 in FIG. 1. The operational flow for the selective decompression begins with an inverse data rebinning step 410.

The selective 3D inverse wavelet transform step 408 converts the compressed 3D wavelet coefficients back to the mosaic images. For a single scale wavelet synthesis, a separate one dimensional wavelet synthesis operation is performed for the radius axis, the angular axis and the height axis. The synthesis operation begins at the lowest resolution scale, and moves gradually to higher resolution scales. Once again a lifting wavelet implementation can be used. For further details of the inverse wavelet lifting, reference is made to the published document ISO/IEC JTC1/SC29/WG1N1422, "JPEG 2000 verification model 5.0", which is included herein by reference, and for all purposes.

The selective 3D inverse wavelet transform step 408 calls the reverse block quantizer 406 and block entropy decoder 404 in FIG. 4 for the access of a block of coefficients encoded to the bitstream. The reverse quantizer step 406 converts the quantized coefficient into original wavelet coefficient. The functionality of the block entropy decoder step 404 is to find the block where the requested column resides, to locate the block bitstream with the help of the index table in the compressed concentric mosaic, and to decode the entire block.

Experimental Results

The performance of the 3D wavelet concentric mosaic compression with smart-rebinning has been demonstrated with initial experimental results. The test concentric mosaic scenes are "Lobby" and "Kids". The Lobby scene has 1350 frames at resolution 320×240, the total data amount being 297 MB. The Kids scene has 1462 frames at resolution 352×288, and the total data amount is 424 MB. The Kids scene contains more details, and is thus more difficult to compress than the Lobby scene.

In a first step, each of the scenes was converted from a RGB color-space to a corresponding YUV color-space with 4:2:0 sub-sampling, which is then compressed to the bitstream. The Lobby scene was compressed at a ratio of 200:1 (0.12bpp, 1.48 MB) and 120:1 (0.2bpp, 2.47 MB). The Kids scene was compressed at a ratio of 100:1 (0.24bpp, 4.24 MB) and 60:1 (0.4bpp, 7.07 MB).

The experimental results are listed in the Table shown in FIG. 11. The peak signal-to-noise-ratio (PSNR) between the original and decompressed scene is shown as the objective measure of compression quality. The PSNRs of all three color components (Y, U and V) are listed in the Table, however, it is the PSNR result of the Y component that matters most in a typical user environment. Therefore, the following comments are based on the Y component PSNR.

In the Table of FIG. 11, a comparison is made between the simple and smart rebinning processes and three benchmark algorithms. The first algorithm (A) compresses the entire concentric mosaics as a video sequence using an MPEG-2 video codec. In the MPEG-2 codec, the first frame is independently encoded as I frame, and the rest frames are predictively encoded as P frames. The second algorithm (B) is a direct 3D wavelet codec, wherein the concentric mosaic image shots are aligned and encoded with 3D wavelet and arithmetic block coding. The third benchmark algorithm (C) is a reference block coder (RBC). It is a prediction-based codec tuned for the compression of the concentric mosaics.

From the Table, it is obvious that the direct 3D wavelet coding of the concentric mosaic scene (algorithm B) is not very efficient, it is 0.3 to 1.0 dB inferior to the MPEG-2, with an average of 0.6 dB, and is inferior to the RBC codec with an average of 1.1 dB.

Three different exemplary configurations of a 3D wavelet codec with smart rebinning were tested. The first configuration (algorithm D), implemented a simple rebinning scheme that set that the horizontal displacement vector between frames to be constant. The actual displacement vector was 2 and 3 for the Lobby and Kids scene, respectively. The resultant rebinned concentric mosaics form a rectangular panorama volume that is compressed by the exact same 3D wavelet and arithmetic block coder presented in algorithm B. It is observed that simply by rebinning multiple slits into the panorama, a large compression gain is achieved. In fact, compared with the direct 3D wavelet codec, the PSNR improves between 3.2 to 3.6 dB, with an average of 3.5 dB. Further, the 3D wavelet with the simple rebinning outperforms MPEG-2 concentric mosaic codec by 2.9 dB, and outperforms RBC by 2.4 dB.

Further experiments loosened the restrictions and apply the full-fledged smart-rebinning. The horizontal displacement vectors were calculated by matching neighborhood concentric mosaic image shots. They are then stored in the compressed bitstream. After the rebinning operation, the bounding volume for the rebinned panoramas is 2832×162×240 for the Lobby scene and 5390×149×288 for the Kids scene.

In the Lobby scene, objects are of relatively constant depths to the camera, and the unsupported regions occupy only 6% of the bounding volume. However, in the Kids scene, 36% of the bounding volume is unsupported. The rebinned panoramas were then compressed either through padding and the same 3D wavelet codec as the one used in algorithm B and D (denoted as algorithm E), or through an arbitrary shape wavelet transform and coefficient coding (denoted as algorithm F).

As result shown in algorithm F, the smart rebinning further improves the compression performance over the simple rebinning by 0.7 to 1.0 dB, with an average of 0.8 dB. The average gain of arbitrary shape wavelet transform (F) with the padding approach (E) is 0.3 dB.

Note that the system of algorithm E is very close in complexity to that of simple rebinning (algorithm D), because both systems use rebinning, rectangular 3D wavelet transform and arithmetic block coder. The only difference is that algorithm D rebins a fixed number of slits into the panorama, and algorithm B rebins a variable number of slits into the panorama, which is then padded before coding. In terms of PSNR performance, algorithm E outperforms algorithm D by 0.5 dB on average, therefore smart rebinning with horizontal translation vectors of image shots does have advantage in the coding system.

Overall, the smart rebinning with arbitrary shape wavelet transform and coding was the best performer. This approach outperformed MPEG-2 concentric mosaic codec by an average of 3.7 dB, outperformed the direct 3D wavelet video encoder by 4.3 dB, and outperformed the reference block coder by 3.2 dB. The PSNR of smart rebinning compressed Lobby at 0.12 bpp is 2.1 dB superior to the MPEG-2, 2.4 dB superior to the direct 3D wavelet, and 1.5 dB superior to the RBC compressed scene compressed at 0.2 bpp. Since the PSNR of the Lobby scene compressed at 0.2 bpp is on average 2.1 dB higher than the PSNR of the same scene compressed at 0.12 bpp, the smart rebinning almost quadruples the compression ratio for the Lobby scene. It is also noted that the smart rebinning nearly doubles the compression ratio for the Kids scene over prior approaches. Considering the huge data amount of the concentric mosaic, and considering the relative large bitstream even after high ratio compression (1.48–7.07 MB), the smart rebinning is a very effective tool to greatly reduce the data amount of the concentric mosaic.

Figures 16, 17:
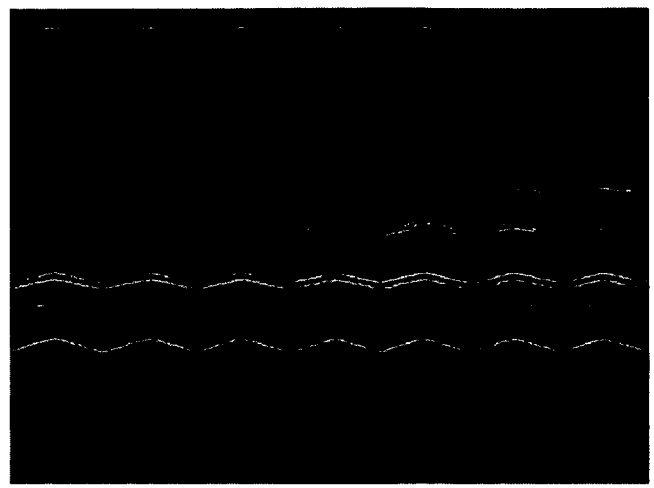
FIG. 16 is a pictorial representation of a portion of the plurality of image shots in FIG. 15 following a Rebinning Of SlitS (ROSS) process.
FIG. 17 is a second Table comparing experimental results for compressing concentric mosaic images associated with the exemplary scenes, i.e., the Lobby scene and the Kid's scene, based on the compression of the data using the rebinning of slits process.

With regard to the ROSS algorithm, experimental results of the COM scene compression are shown in the Table in FIG. 17. The experimental data are again the Lobby scene (1350×320×240) and the Kids scene (975×360×288). The Lobby scene was compressed at 0.2 bpp and 0.4 bpp. The Kids scene, which has more details, was compressed at 0.4 bpp and 0.6 bpp.

The Table in FIG. 17 compares an exemplary ROSS algorithm with two benchmark algorithms. The first benchmark algorithm treats the entire COM scene as a video and compresses it with a MPEG-2 codec. The second benchmark algorithm simply compresses each individual COM shot independently with JPEG 2000 VM 5.0. The objective PSNR is measured between the original COM scene and the decompressed scene. Again, since it is the Y component that matters most in compression, only on the Y component PSNR is addressed below.

In FIG. 17 it can be seen that ROSS outperforms independent JPEG 2000 compression by 3.3–4.6 dB, with an average performance gain of 4.0 dB. This result demonstrates that the rebinning approach used by ROSS significantly improves the compression performance of high dimensional data.

The performance gain of ROSS versus MPEG-2 ranges from 0.6–1.3 dB, with an average of 1.0 dB. Thus, ROSS presents an alternative way to explore the cross-frame redundancy other than the motion condensation used in MPEG-2. Moreover, the COM scene compressed by MPEG-2 may not be accessed randomly, but the one compressed with ROSS may if a random access friendly still image coder, such as JPEG 2000, is used.

Although some preferred implementations of various methods and arrangements have been illustrated in the accompanying Drawings and described in the foregoing Description, it will be understood that the invention is not limited to the exemplary implementations disclosed, but is capable of numerous rearrangements, modifications and substitutions as set forth and defined by the following claims.

What is claimed is:

1. A system comprising:
   means for selectively aligning at least two image based rendering (LBR) image data along a specific direction; and
   means for selectively rebinning the aligned IBR image data to form a multi-perspective panorama including:
   means for determining at least one displacement vector associated with the at least two IBR image data,
   means for subdividing at least one of the IBR image data based on the displacement vector, and
   means for combining specific portions selected from each IBR image data to form at least a portion of the multi-perspective panorama.

2. The system as recited in claim 1, wherein the IBR image data includes concentric mosaic (COM) image data.

3. The system as recited in claim 2, wherein the specific direction is substantially a horizontal direction with respect to a captured scene.

4. The system as recited in claim 1, wherein the means for selectively aligning the at least two image based rendering (IBR) image data further includes means for pair-wise aligning of concentric mosaic (COM) image data.

5. The system as recited in claim 1, wherein the means for selectively rebinning the aligned IBR image data to form the multi-perspective panorama further includes:
 means for subdividing each of the IBR image data into a plurality of portions.

6. The system as recited in claim 5, wherein the means for subdividing each of the IBR image data into the plurality of portions further includes means for subdividing the IBR image data based on a magnitude of the displacement vector.

7. The system as recited in claim 6, wherein the displacement vector is a motion vector.

8. The system as recited in claim 6, wherein the means for determining at least one displacement vector further includes means for setting the displacement vector for each of the at least two IBR image data to be of equal magnitude so as to support a simple rebinning process.

9. The system as recited in claim 6, wherein the means for determining at least one displacement vector further includes means for setting the displacement vector for each of the at least two IBR image data to be of different magnitude while supporting a smart rebinning process.

10. The system as recited in claim 1, further comprising:
 means for generating a set of multi-perspective panoramas to provide a dense representation of an IBR captured environment.

11. The system as recited in claim 10, further comprising:
 means for encoding at least a portion of the multi-perspective panoramas using a 3D wavelet transform.

* * * * *